United States Patent [19]

Yabe

[11] Patent Number: 4,468,107
[45] Date of Patent: Aug. 28, 1984

[54] MACRO-FOCUSSING REAR CONVERTER LENS

[75] Inventor: Shinji Yabe, Tokyo, Japan

[73] Assignee: Yabe Optical Inst. Mfg. Co., Ltd., Tokyo, Japan

[21] Appl. No.: 397,806

[22] Filed: Jul. 13, 1982

[30] Foreign Application Priority Data

Feb. 25, 1982 [JP] Japan .................................. 57-28147

[51] Int. Cl.³ .......................... G03B 3/00; G02B 7/04
[52] U.S. Cl. ............................... 354/286; 354/195.1; 350/255
[58] Field of Search ............... 354/195, 197, 286, 46, 354/199, 195.1, 195.12; 350/255, 257, 427, 428, 429, 430

[56] References Cited

U.S. PATENT DOCUMENTS

| | | | |
|---|---|---|---|
| 3,465,662 | 9/1969 | Kashiwase | 350/430 |
| 3,613,544 | 10/1971 | Plihal et al. | 354/199 |
| 3,731,987 | 5/1973 | Iida et al. | 350/430 |
| 3,784,285 | 1/1974 | Watanabe et al. | 350/428 |
| 3,914,026 | 10/1975 | Kanno | 350/255 |
| 3,969,018 | 7/1976 | Reinsch et al. | 350/430 |
| 3,980,398 | 9/1976 | Belvard | 350/430 |
| 4,003,068 | 1/1977 | Hashimoto et al. | 354/286 |
| 4,089,590 | 5/1978 | Sakata | 350/430 |
| 4,114,984 | 9/1978 | Muryoi | 350/430 |
| 4,255,020 | 3/1981 | Yukio | 350/430 |
| 4,333,712 | 6/1982 | Tomori | 350/430 |
| 4,346,967 | 8/1982 | Komoto et al. | 350/430 |

Primary Examiner—A. A. Mathews
Attorney, Agent, or Firm—Robert E. Burns; Emmanuel J. Lobato; Bruce L. Adams

[57] ABSTRACT

A macro-focusing rear converter lens system adapted to be inserted between a camera body and a master lens assembly comprises a cylindrical main body which is mounted on the camera body. A rear converter lens assembly for elongating the focal length of the master lens is mounted in fixed relation on the camera body. The master lens assembly is mounted on the front end of a tube which is fitted coaxially within the main body and is movably axially by means of a helicoidal threaded rotatable ring interposed between the main body and the tube on which the master lens assembly is mounted. The interval between the camera body and the master lens assembly can thus be varied by rotating the rotatable ring. A leverage system in the main body transmits an F number signal from the master lens system to the camera body.

10 Claims, 2 Drawing Figures

MACRO-FOCUSSING REAR CONVERTER LENS

BACKGROUND OF THE INVENTION

1. Field of the Invention

This invention relates to a rear converter lens, particularly to a rear converter lens having the function of a macro-lens.

2. Description of the Prior Art

When the function of a macro-lens is given to a camera, it is known that the photographic objective is fitted with an extention tube or a special rear converter lens. Since the whole lens is made to shift without changing the interval between the rear and front mount of the converter in these kinds of known rear converter lens, the lens will approach nearer to the surface of a film as the magnification of lens is made higher. Consequently, the lens back should be made considerably long and the total length of the converter lens becomes longer, resulting in that it is unhandy to carry. To shorten the total length of the converter lens, the total length of lens formation should be made shorter, and number of lenses should be made smaller, so that good correcting aberrations will become difficult. Further, in such a known type that the whole lens is made to move, photographing with magnification from 1:∞ to 1:1 could not be effected.

Among known cameras, there are those in which for transmitting the F number at open aperture of the photographing lens (the master lens) to the camera body, a signal pin having the height corresponding to the F number at open aperture is projectingly provided on the rear portion of the lens, and this pin is made to abut on a receiving piece on the side of camera body. Therefore, in the rear converter lens used for these kinds of cameras, an interconnecting rod communicating from the side of the master lens to the side of the camera body is provided to make the length of the interconnecting rod equal to the length of the interval between the rear and front mount. The signal pin provided on the mater lens is made to abut on one end of the interconnecting rod, the other end of which is made to project on the side of the camera body by the same amount as the height of the signal pin. Thereby the F number at open aperture of the master lens is transmitted to the side of the camera body. While, in the rear converter lens, in which the interval between the rear and front mount is varied, such an interconnecting system as mentioned above cannot be used.

SUMMARY OF THE INVENTION

The object of this invention is to provide a macro-focusing rear converter lens, wherein the total length of the converter lens can be made shorter in carriage; good correcting aberrations can be effected by increasing the number of lenses; and further the photographing with magnification from 1:∞ to 1:1 can be continuously effected.

Another object of the invention is to provide a rear converter lens, which can surely transmit the F number at open aperture of a master lens to the side of the camera body, even though the function of a macro-lens is added as mentioned above.

According to the invention, a rear converter is provided, wherein a lens system is fixedly provided on the main body, which is fitted with a tube, and by moving the tube in the direction of optical axis, the interval between the flange face on the side of camera body and the flange face on the side of master lens is varied, whereby the function of a macro-lens is provided.

Further, according to this invention, a macro-focusing rear converter lens is provided, which comprises a cam means to be moved in the direction of the optical axis by a signal pin provided on the master lens and to convert its movement into rotary motion around the optical axis, there are an interconnecting plate to be rotated by the cam means, and another cam means to convert the rotary motion of the interconnecting plate into the movement in the direction of optical axis.

Other objects and features of the invention will become apparent from the following detailed description with reference to the accompanying drawings.

DESCRIPTION OF THE PREFERRED EMBODIMENT

Figure 1:
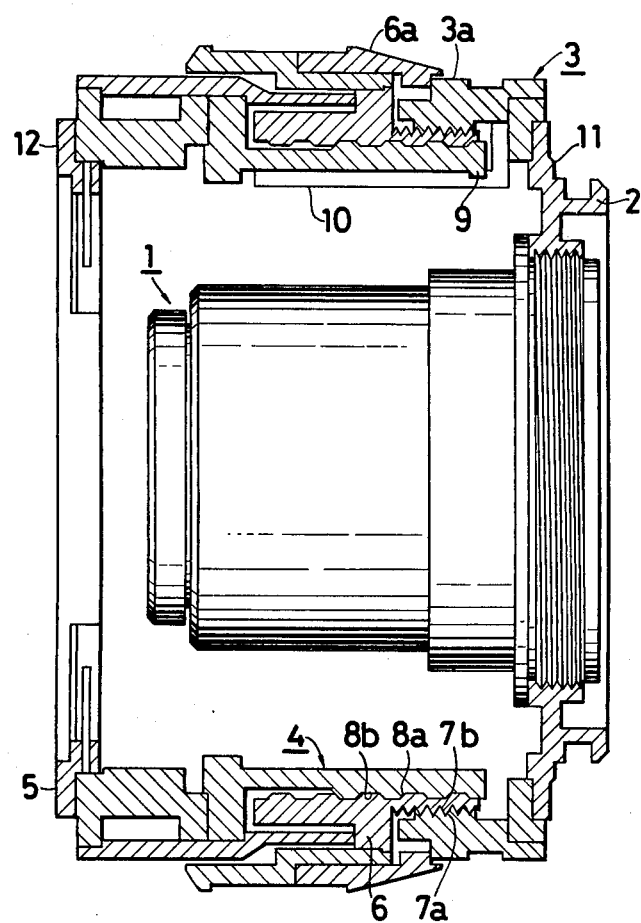
FIG. 1 is a sectional view of a rear converter lens according to this invention, wherein the lens housing assembly is not sectioned and cam means and the like for transmitting the F number at open aperture are not provided.

In the rear converter lens shown in FIG. 1, the converter lens system is provided in a lens housing assembly 1, which is fixed by means of screws (not shown) to the main body 3 having rear mount assembly 2 to be mounted on the side of the camera body. The main body is fitted with a tube 4, which is movably provided along the optical axis. In the lens shown in FIG. 1, the tube is provided on the side of master lens and a front mount 5 for mounting the master lens is formed on the end portion thereof. If desired, it is possible that the tube is provided on the side of camera body to be expanded and contracted, and the main body is provided on the side of master lens to fix the lens housing assembly to the main body (now shown).

As an expansion and contraction mechanism of the tube in the direction of optical axis, known mechanism such as straight advance system by means of key and key way and the like may be adopted. However, an expansion and contraction mechanism by means of helicoid is utilized in the drawing. Namely, a revolving ring assembly 6 is fitted between the tube 4 and the main body 3 and by means of screw threads 7a, 7b provided on outer face of the revolving ring assembly and inner face of the main body, the revolving ring assemby is rotatably mounted on the main body. While, on inner face of the revolving ring and on outer face of the tube, helicoid screws 8a, 8b with reversed threads relative to screws 7a, 7b are provided to mount the revolving ring assembly and the tube rotatably. With a key way 9 provided on the inner face of the tube, a key 10 fixed to the main body 3 extended in the direction of optical axis is slidably engaged. When an indication of magnification is preferably marked on outer periphery 6a of the revolving ring assembly and a fixed indication is marked on outer periphery 3a, a desired magnification will be easily obtained.

And, when the rear mount assembly 2 is engaged with the camera body (not shown) and the master lens (not shown) is engaged with the front mount assemby 5, the flange face 11 of the rear mount assembly will closely contact onto the flange face of the camera body and the flange face of the master lens will closely contact onto the flange face 12 of the front mount assembly. In the state as shown in FIG. 1, the master lens may be used with its focal length elongated due to the function as an ordinary rear converter lens. In the next place, for close-up photography, the revolving ring assembly is turned to set to the desired indication of magnification, the tube will not rotate but expand or contract in the direction of optical axis (in the drawing move to the right or to the left), because the rotation of tube is regulated by means of the key 10 and the key way 9, thus the interval between the rear and front mount will be varied. Hereupon, since the lens housing assembly does not move, the distance between the lens housing assembly and the film face will not be changed. But the distance between the lens housing assembly and the master lens will become longer or shorter, thus the close-up photography may be continuously effected with the magnification from $1:\infty$ to $1:1$.

Figure 2:
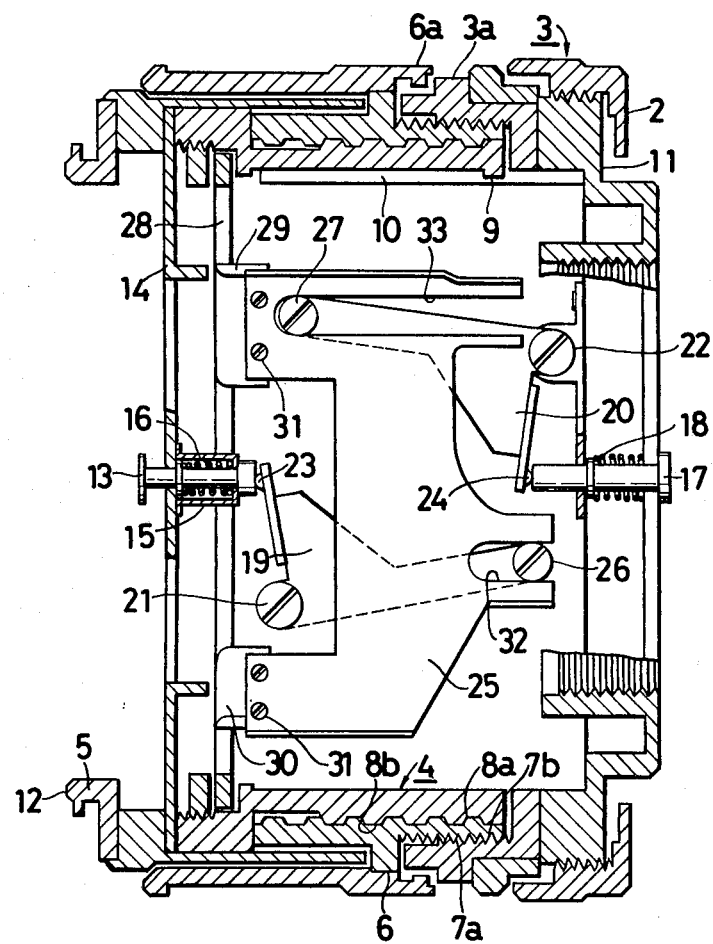
FIG. 2 is a sectional view of a rear converter lens according to this invention, showing another embodiment, in which the lens housing assembly is omitted.

In FIG. 2, there is shown a converter lens preferably used in a camera, of which master lens is projectingly provided with a signal pin to show the F number at open aperture. And, in this drawing, the converter lens housing assembly is omitted. Further, although the shapes are different, the main body, the tube, the revolving ring assemby and the mount assemblies are not essentially different from those of the above embodiment. In the drawing, when the master lens is engaged with the front mount assembly 5, an interconnecting pin 13 is inserted into a guide cylinder 15 of a plate 14 mounted on the tube 4, preferably urged by a spring 16, thus the interconnecting pin is provided movably in the direction of optical axis, so as to be abutted by a signal pin (not shown) of the master lens. On the other hand, when the rear mount assembly is engaged with the camera body, an interconnecting pin 17 is provided on the main body 3 so as to abut on a signal receiving pin (not shown), preferably urged by a spring 18, enabling the pin to move in the direction of optical axis. Further, the tube 4 and the main body 3 are provided with cam means which will convert the movement in the direction of optical axis or the movement in peripheral direction into the movement in peripheral direction (rotary motion around the optical axis) or the movement in the direction of the optical axis. In the embodiment shown in the drawing, bell crank levers in the form of substantially L-shaped cam plates 19, 20 are pivoted at 21, 22 to be rocked. The cam plates have, on their one end, contact points 23, 24 projectingly formed so as to abut against inner end side of the respective interconnecting pin, and on their other end, projections 26, 27 are provided for connecting with an interconnecting plate 25 to be described later. The interconnecting plate 25 is made to bend cylindrically along the inner periphery of the tube and provided so as to rotate in peripheral direction (around the optical axis). In the drawing, the interconnecting plate is fixed by screws 31 to flanges 29, 30 which are formed by inwardly folding a portion of a mounting plate 28 rotatably provided on the tube. If desired, the mounting plate may be rotatably mounted on the side of the main body and the interconnecting plate may be fixed to the mounting plate. Although omitted in the drawing, ball bearings may be preferably provided on rotary portions. On the interconnecting plate, engaging grooves 32, 33 are formed along the direction of optical axis, which grooves are slidably fitted with projections 26, 27 of cam plates 19, 20 respectively. In the drawing, the interconnecting plate is mounted on the side of tube, so that the engaging groove 33, which is fitted by the projection 27 of the cam plate 20, is formed longer corresponding to the amount of movement of the tube and connecting portion between the cam plate and the interconnecting plate is formed shiftably in the direction of optical axis. When the interconnecting plate is mounted on the side of the main body, the engaging groove 32 fitted by the projection 26 of other cam plate 19 may be formed longer corresponding to the amount of movement. And, the projections may be provided on the interconnecting plate reversely to those shown in the drawing and the engaging grooves may be provided on the cam plates. The distance between the contact point 23 and the pivotal portion 21 of the cam plate 19 and the distance between the pivotal portion 21 and the projection 26 are respectively formed equally to the distance between the contact point 24 and the pivotal portion 22 of the cam plate 20 and the distance between the pivotal portion 22 and the projection 27. Thereby, when the contact point of one cam plate is moved in the direction of the optical axis via the interconnecting plate, the contact point of another cam plate will move with equal amount in the direction of optical axis. So that, when the rear mount assembly is engaged with the camera body and the master lens is engaged with the front mount assembly, the signal pin of the master lens will abut against the interconnecting pin 13 and the interconnecting pin 13 will move in the direction of optical axis corresponding to the height of the signal pin. Thereby, the cam plate 19 rocks in a peripheral direction via the contact point 23 and the interconnecting plate 25 rotates via the projection 26 and the engaging groove 32. The rotation of the interconnecting plate is transmitted to the cam plate 20 as a rocking motion via the engaging groove 33 and the projection 27, thus the interconnecting pin 17 is moved in the direction of optical axis via the contact point 24 of the cam plate. The signal receiving pin of the camera body is pressed by the interconnecting pin with the amount corresponding to the height of the signal pin of the master lens, and F number at open aperture of the master lens is transmitted to the camera body.

For the purpose of close-up photography, when the tube is expanded and contracted as mentioned above and shown in the drawing, the cam plate, the interconnecting plate and the like connected with the tube will move in the direction of the optical axis together with the tube, but the connecting portion (projection and engaging groove) of the cam plate and the interconnecting plate provided on the main body is shiftably formed in the direction of optical axis, so that the F number at open aperture of the master lens can be transmitted to the camera body similarly to the above description. As cam means, suitable mechanism other than those shown in the drawing may be used.

It is to be understood that the present invention is not limited to the above mentioned embodiment thereof, but may be otherwise variously modified within the scope of the following claims.

What is claimed is:

1. A macro-focusing rear converter lens system adapted to be inserted between a camera body and a master lens assembly comprising:
   a cylindrical main body,
   a mounting asembly on said main body for mounting it on the camera body, a rear converter lens system for elongating the focal length of said master lens, said rear converter lens system having an optical axis and means for mounting said lens system inside said main body in fixed relation on the camera body, a tube fitted coaxially within said main body and being movable along said optical axis, means on a front end of said tube for mounting said master lens assembly thereon, a revolving ring assembly inserted rotatively between said main body and said tube for moving said tube along said optical axis by rotation of said revolving ring assembly, and means for rotating said revolving ring assembly for moving said tube along said optical axis to vary the interval between said master lens assembly and the camera body while said rear converter lens system remains fixed relative to the camera body, whereby the camera is focused for macro-photography.

2. A lens system according to claim 1, in which said tube and said main body are provided with an intergaging key and keyway for preventing rotation of said tube relative to said main body while permitting movement of said tube relative to said main body along said optical axis.

3. A lens system according to claim 2, in which said revolving ring assembly comprises a sleeve portion having on its inner periphery helicoidal threads interengaging helicoidal threads on an outer periphery of said tube.

4. A lens system according to claim 3, in which screw threads on the outer periphery of said sleeve portion interengaging internal screw threads in said main body, the pitch of said screw threads being reversed relative to the pitch of said helicoidal threads.

5. A lens system according to claim 1, in which said revolving ring assembly has an outer peripheral portion adjacent an outer peripheral portion of said main body, and in which cooperating indicia are provided on said respective outer peripheral portions to calibrate the rotation of said revolving ring assembly and thereby calibrate the interval between said master lens assembly and the camera body.

6. A lens system according to claim 1, further comprising means inside said main body for transmitting an F number signal between said master lens assembly and the camera body, said F number signal transmitting means being unaffected by axial movement of said tube relative to said main body and corresponding variation of the interval between said master lens assembly and the camera body.

7. A lens system according to claim 6, in which said F number signal transmitting means comprises a first signal pin mounted on said tube at the front end thereof and movable parallel to said optical axis, said first signal pin being adapted to be moved axially by an F number signal from said master lens system, a second signal pin mounted on said main body at the rear end thereof and movable parallel to said optical axis to transmit an F number signal to an F number signal receiving member in the camera body, and means for transmitting axial movement from said first signal pin to said second signal pin, said movement transmission being unaffected by axial movement of said tube relative to said main body.

8. A lens system according to claim 7, in which said movement transmitting means comprises an arcuate interconnecting plate rotatable about said optical axis, first lever means operatively connecting said first signal pin with said interconnecting plate to convert axial movement of said first signal pin into rotary movement of said interconnecting plate, and second lever means operatively interconnecting said interconnecting plate with said second signal pin to convert rotary movement of said interconnecting plate into axial movement of said second signal pin.

9. A lens system according to claim 8 in which said first lever means comprises a bell crank lever pivotally mounted in said tube and having a first arm engaged by said first signal pin and a second arm provided with an abutment received in a slot in said interconnecting plate.

10. A lens system according to claim 9 in which said second lever means comprises a second bell crank lever pivotally mounted in said main body and having one arm engaging said second signal pin and a second arm provided with an abutment received in a second slot in said interconnecting plate, one of said slots extending parallel to said optical axis a sufficient distance to permit axial movement of said tube relative to said main body without affecting the rotational position of said interconnecting plate.

* * * * *